Aug. 23, 1938.   J. E. GRAF ET AL   2,127,511
CLASSIFYING APPARATUS
Filed Feb. 19, 1935    4 Sheets-Sheet 3

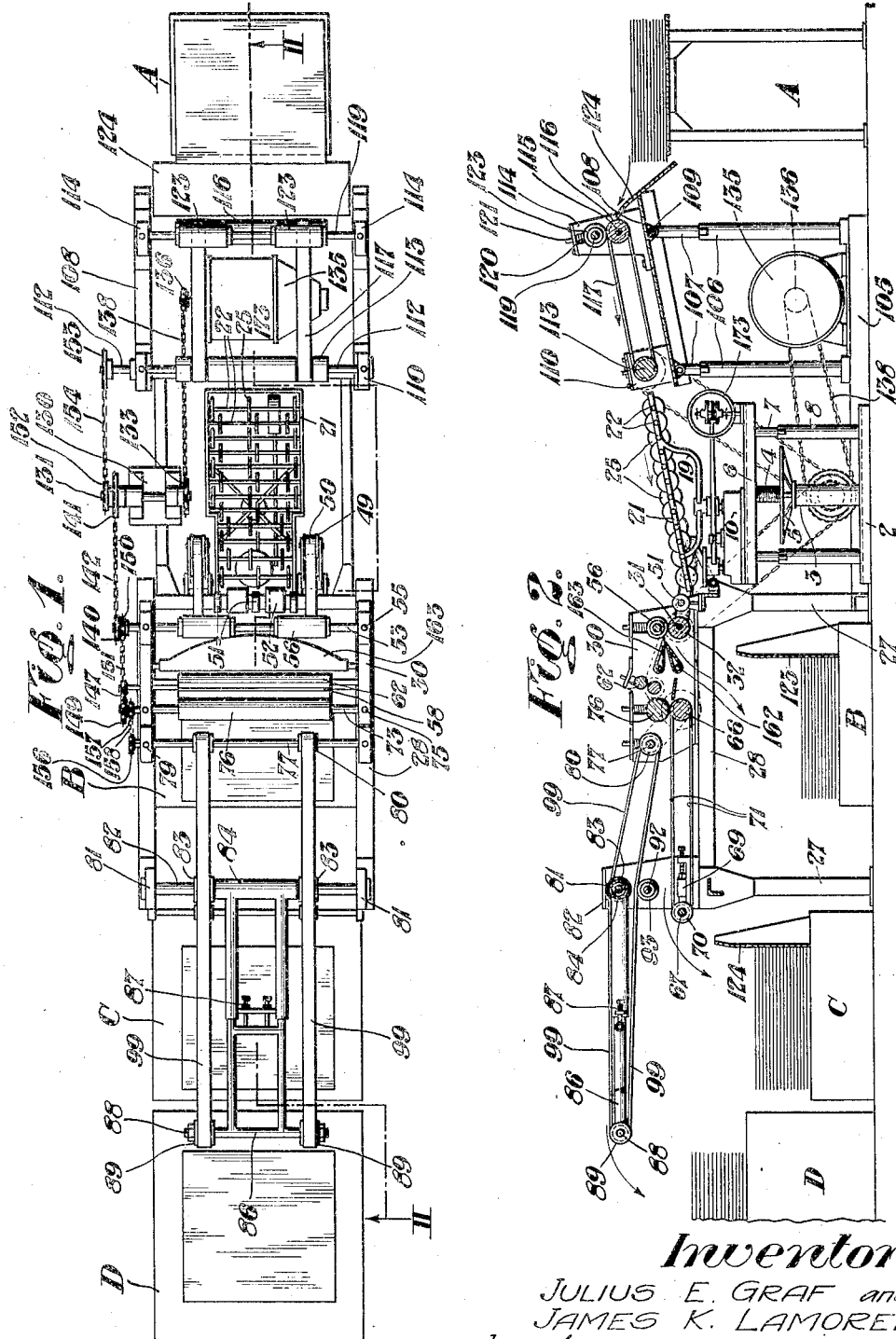

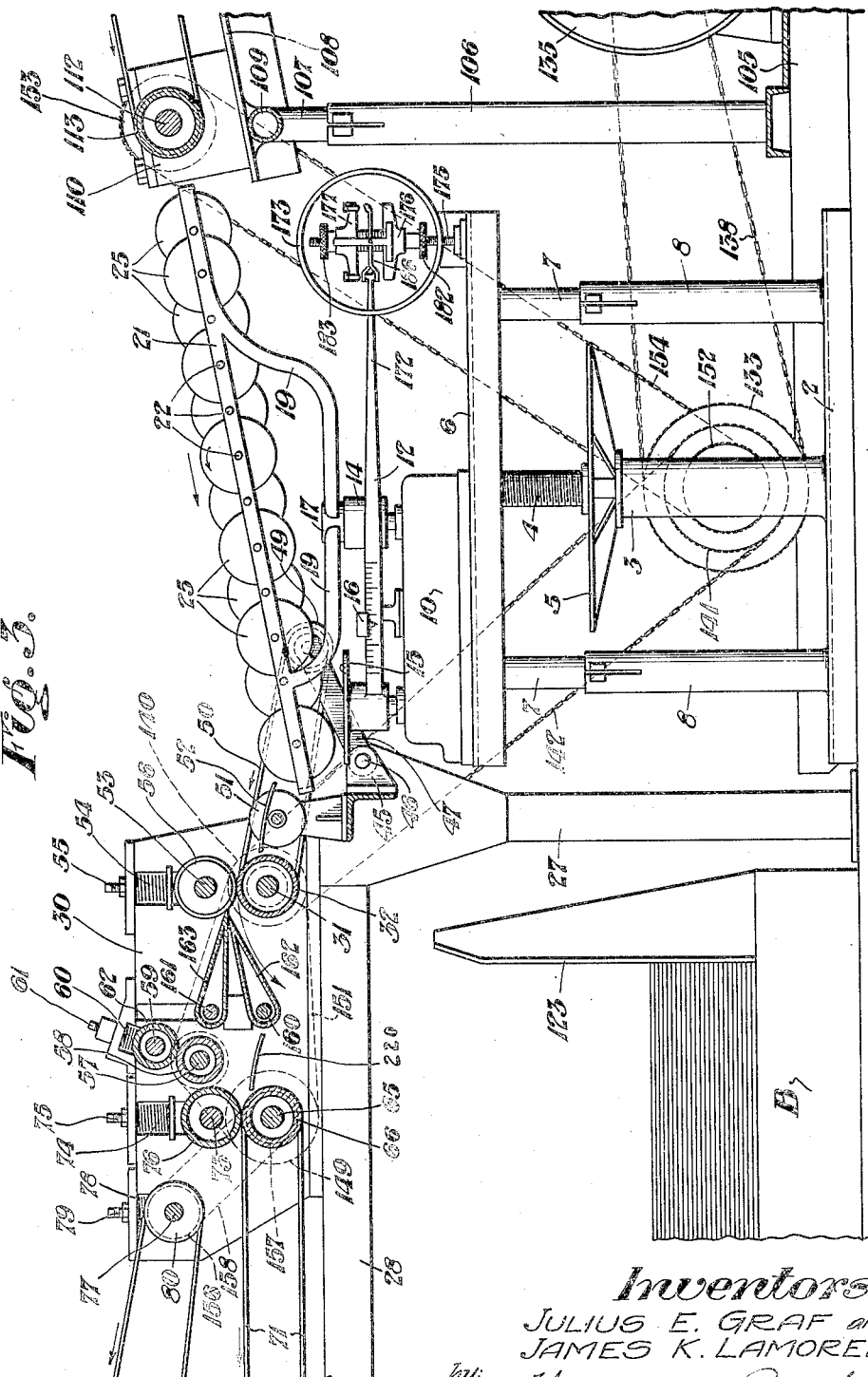

Inventors:
JULIUS E. GRAF and
JAMES K. LAMOREE.
by Usina & Rauber
their Attorneys.

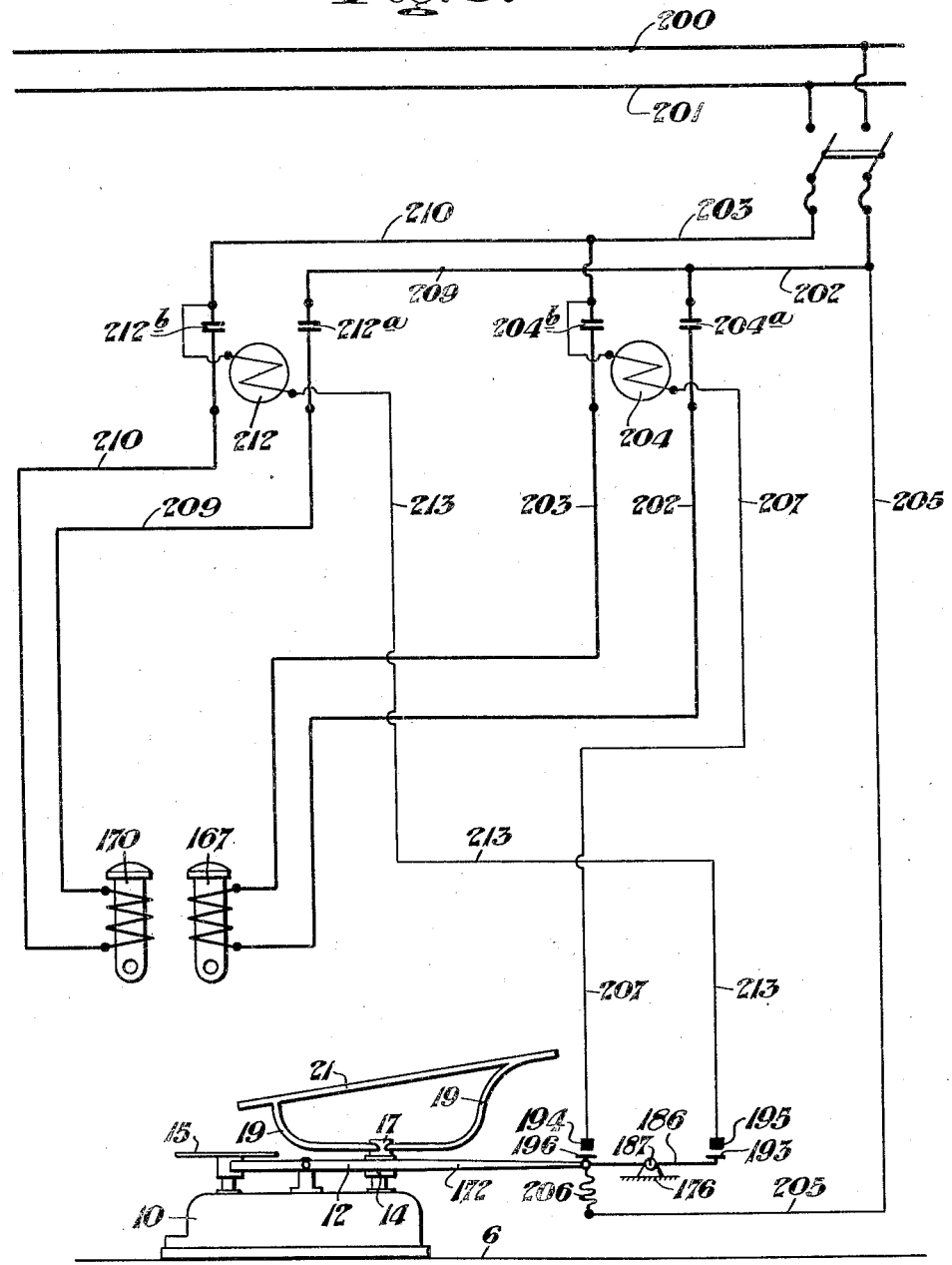

Patented Aug. 23, 1938

2,127,511

UNITED STATES PATENT OFFICE 2,127,511

CLASSIFYING APPARATUS

Julius E. Graf, Avalon, and James K. Lamoree, Mount Lebanon, Pittsburgh, Pa., assignors to American Sheet and Tin Plate Company, a corporation of New Jersey Application February 19, 1935, Serial No. 7,290

3 Claims. (Cl. 209—121)

This invention relates to a classifying apparatus, and more particularly one which is adapted to the automatic weighing and sorting of sheet materials, although not limited thereto.

In the manufacture of metallic sheet material, by way of example, it is particularly important that they be classified within narrow limits in weight. This is frequently done automatically but must be carried on in a very rapid manner, otherwise a high cost of handling results. Among the numerous devices of the prior art are those which impose a slowness of operation such as to make their use prohibitive. In addition, various other types of apparatus have been devised which employ magnetic elements, which necessarily confine their field of operation to materials which have magnetic tendencies. These machines are often rendered inaccurate because their magnetic elements set up a residual and variable magnetic field which not only has a deleterious effect on the weighing mechanism but, in addition, retards the speed at which the sheets could and should be handled. Another undesirable feature of these magnetic devices is that they cause excessive vibrations which directly affect the sensitivity of balance of the weighing mechanism.

It is one of the objects of the present invention to provide a novel classifying apparatus which rapidly and automatically weighs and sorts materials within predetermined and close weight limits and one which at the same time is not confined to materials which are magnetically inclined.

Another object is the provision of a classifying apparatus of the type described which operates in a continuous and rapid manner and one which is at the same time relatively cheap and easy to manufacture and use.

A further object of the invention is to provide a novel classifying apparatus which embodies, in part, a weighing mechanism which functions within close limits upon sheet material which is traveling thereover by gravity, thus obviating the employment of extraneous assisting devices with their deleterious action.

The foregoing and further objects will be apparent after referring to the drawings, in which:

Figure 1 is a plan of the apparatus of the invention.

Figure 2 is a sectional side elevation on the line II—II of Figure 1.

Figure 3 is an enlarged fragmentary side elevation, shown partly in section.

Figure 8 is a diagram of a wiring circuit which may be used to operate the various devices of the apparatus in accordance with the teaching of the invention.

Figure 4:
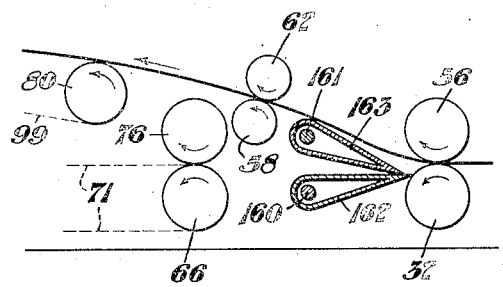
Figures 4 and 5 are schematic views disclosing two modes of operation of the apparatus.

Referring more particularly to the drawings, the numeral 2 designates a base for part of the apparatus of the invention. A vertical column 3 is suitably secured on the upper and central portion of the base 2 and carries a telescoping screw 4 which is vertically adjustable by a handwheel 5. A table 6 is secured to the upper portion of the telescoping screw 4 and is maintained and braced in correct horizontal position by a plurality of downwardly depending guides 7, each of which telescopes within and is adapted to be secured to a tubular guideway 8. These tubular guideways 8 are secured to the base 3 in any suitable manner and are each equipped with a clamping device in order to provide for the securing of the downwardly depending guides 7.

A scale, generally indicated at 10, is disposed upon the table 6, being essentially one which is very accurate, but as such forms no part of the present invention. The scale 10 is preferably of that type which provides a horizontal balance beam 12, balance column 14, weight platform 15, and indicates the measurement by means of a poise 16.

According to the teaching of the invention a cradle, generally indicated at 17, is mounted on the balance column 14. This cradle 17 is composed of two pairs of cross-arms 19 on which there is mounted a pair of spaced-apart side rails 21. The side rails 21 are inclined with respect to the plane of the table 6 and support a plurality of spaced and freely rotatable transverse shafts 22. A plurality of freely rotatable disks 25 are mounted upon the transverse shafts 22 and are staggered with respect to each other. The inclination of the side rails 21, rotatable shafts 22 and the rotatable disks 25 provide an extremely efficient and substantially frictionless gravity conveyer across which the sheets to be weighed and classified are made to travel.

A plurality of vertical supports 27 are disposed adjacent the base 2 and support a table 28 whose surface is adjacent the horizontal center-line of the lowermost transverse shaft 22 of the cradle generally indicated at 17. A housing 30 is mounted upon the table 28 and has journaled therein a rotatable shaft 31 to which there is secured an elongated steel cylinder 32. A pair of ears 45 are secured to each side of the end of the table 28 which is adjacent the base 2 and each pair provided with a pin 46. A pair of links 47 are connected on one of their ends to each pin 46, and each carries a roller 49 on the other end thereof. A belt 50 is snugly disposed around each of the rollers 49 in an alined groove in the elongated steel cylinder 32 on the rotatable shaft 31.

A plurality of spaced-apart idle rollers 51 are disposed on the table 28 between the shaft 31 and the lowermost transverse shaft 22 of the cradle 17. These idle rollers 51 are adapted to assist the gravity feed of the sheets being weighed and classified from between the belts 50, and their function is augmented by guide plates 52.

A shaft 53 is disposed in the housing 30 immediately above the shaft 31 and journaled in bearings which are resiliently pressed toward the latter by springs 54. A satisfactory adjustment of each of the springs 54 is effected by an individual adjuster, as at 55.

A pair of spaced-apart rubber-covered cylinders 56 are secured to the shaft 53, one above and in contact with each of the belts 50 which are disposed in the grooves in the elongated cylinder 32.

A shaft 57 is journaled in the housing 30 in substantial parallelism with the shaft 53, and has secured thereto an elongated steel cylinder 58. A shaft 59 is disposed in the housing 31 above and offset from the shaft 57 and is journaled in bearings which are resiliently pressed by springs 60. A satisfactory adjustment of each of the springs 60 is effected by an individual adjuster, as at 61. An elongated steel cylinder 62 is secured to the shaft 59 and is adapted to make contact with the elongated steel cylinder 58 on the shaft 57.

A shaft 65 is journaled in the housing 30 in substantial parallelism with the shaft 31, and below and offset from the shaft 57, and has secured thereto an elongated steel cylinder 66.

A shaft 67 is suitably journaled on the table 28 in substantial parallelism with the shaft 65 and is adjustable with respect thereto by means of an adjusting device 69. The shaft 67 carries a pair of pulleys 70 around which, and in suitable grooves in the elongated steel cylinder 66 there is mounted a pair of belts 71.

A shaft 73 is disposed in the housing 30 immediately above the shaft 65 and is journaled in bearings which are resiliently pressed by springs 74. A satisfactory adjustment of each of the springs 74 is effected by an individual adjuster, as at 75. An elongated steel cylinder 76 is secured to the shaft 73 and is adapted to make contact with the belts 71 in the grooves in the elongated steel cylinder 66.

A shaft 77 is disposed in the housing 30 above and offset from the shaft 73 and is journaled in bearings which are resiliently pressed by springs 78. A satisfactory adjustment of each of the springs 78 is effected by an individual adjuster, as at 79. This shaft 77 has secured thereto a pair of spaced-apart pulleys 80.

A pair of vertical extensions 81 are mounted on the end of the table 28 which is opposite that on which the shaft 31 is journaled in the housing 30. A shaft 82 is journaled in the vertical extensions 81, and carries a pair of relatively rotatable and spaced-apart pulleys 83 which are in alinement with the pulleys 80 on the shaft 77. The shaft 82 is also provided with a relatively rotatable sleeve 84 which is disposed between the pulleys 83. This sleeve 84 carries a laterally extending frame 86 which is rendered adjustable in length by means of an adjusting device 87. A shaft 88 is secured to the end of the frame 86 which is remote from the sleeve 84 and in parallelism with the latter. A pair of spaced-apart pulleys 89 are rotatably mounted on the shaft 88 in alinement with the pulleys 83 on the shaft 82.

A shaft 92 is journaled in the vertical extensions 81 immediately below the shaft 82 and carries a pair of spaced-apart pulleys 93 which are vertically alined with the pulleys 83. A pair of belts 99 are strung between the various pairs of pulleys 83 and 89 and the pulleys 80 on the shaft 77. These belts 99 are not disposed around the pulleys 93 on the shaft 92, but do, however, make contact with the same on their upper portions. This disposition of the belts 99, and the rotatability of the sleeve 84 on the shaft 82, permits the frame 84 and accordingly the former, to assume various angles of inclination with respect to the horizontal, if such is desired, and for a purpose to be later described.

If desired, the sheets to be weighed and classified may be manually disposed upon the freely rotatable disks 25 on the shafts 22 of the cradle generally indicated at 17. This, however, would necessarily have to be done with the exercise of extreme care; otherwise the scale 10 would be overbalanced with the result that the sheets would be improperly weighed and classified. We, therefore, prefer to provide a conveying device adjacent the highest portion of the cradle 17. Accordingly, a base 105 is disposed beside the base 2 and has erected thereon a plurality of vertical standards 106. Each of these vertical standards 106 is provided with a telescoping support 107 which is suitably clamped in adjusted position. A table 108 is adapted to be carried by the upper ends of the telescoping supports 107, and is pivotally connected to each of the latter, as at 109. These pivotal connections permit the table 108 to assume various angles of inclination, with respect to the horizontal, and preferably one which is coincidental with the inclination of the transverse shafts 22 of the cradle 17.

A pair of vertical extensions 110 are mounted on the end of the table 108 which is most adjacent the table 6, and have journaled therein a shaft 112. An elongated and suitably grooved steel cylinder 113 is secured to the shaft 112 for rotation therewith. A pair of vertical extensions 114 are mounted on the other end of the table 108 and have journaled therein a shaft 115. An elongated and suitably grooved steel cylinder 116 is secured to the shaft 115 for rotation therewith. A pair of belts 117 are disposed around the steel cylinders 113 and 116, occupying their various grooved portions. A shaft 119 is disposed in the vertical extensions 114 above the shaft 115 and is journaled in bearings which are resiliently pressed by springs 120. A satisfactory adjustment of each of the springs 120 is effected by an individual adjuster, as at 121. A pair of rubber-covered rolls 123 are secured to the shaft 119, each of which is in contact with one of the belts 117 in the grooved portions of the elongated steel cylinder 116.

In order to assist the introduction of the sheets to be weighed and classified between the elongated and grooved steel cylinder 116 on the shaft 115 and the pair of rubber-covered rolls 123 on the shaft 119, an angularly disposed plate 124 is suitably secured to the uppermost portion of the table 108.

In order to operate the apparatus of the invention it is, of course, necessary to impart rotation to a number of the various and previously described shafts, and we have nominally elected those numbered 31, 57, 65, 77 and 112. This is done in the following manner: A stand 130 is suitably secured to the base 2, on which the table 6 is supported, and has journaled therein a shaft 131. A sprocket 133 is secured to the shaft 131. A motor 135 is suitably mounted on the base 105, on which the table 108 is supported, and is provided with a sprocket 136 on its drive-shaft. A chain 138 is disposed around, and provides a drive between the sprockets 133 and 135. A sprocket is secured to the shaft 31, as at 140, and a sprocket 141 on the shaft 131. These sprockets 140 and 141 are connected together by a chain 142.

Each of the shafts 57 and 65 are provided with a sprocket, as at 147 and 149, respectively, which are connected together and to a sprocket 150 on the shaft 31 by a common chain 151. A third sprocket 152 is secured to the shaft 131 and serves to drive a sprocket 153 on the shaft 112 through a chain 154. A sprocket 156 is carried on the shaft 77 and is driven by a second sprocket 157 on the shaft 65 through a chain 158. The driving of the shafts 112, 31, 57, 65 and 77 serves to actuate the endless belts 117, 50, 71 and 99, which permits the sheets being weighed and classified to move forwardly over the disks 25 on the shafts 22 of the cradle 17, and thence in one of three directions as shown by as many arrows in the left-hand portion of Figure 2.

The sheets to be fed are disposed at the inlet end of the machine on a stand A, and are classified in one of three piles, on shorter stands B, C and D. This classification is effected in direct accordance with the weight of each individual sheet. For example, let it be assumed that sheets weighing 40 ounces apiece are desired to be stacked on the stand C; then those which are underweight will be stacked on the stand B; while those which are overweight will be stacked on the stand D. The weight limits may be regulated to a fine degree. This we propose to do by deflecting the path of travel of the sheet being weighed and classified immediately as it passes from between the grooved and elongated steel cylinder 32 and the rubber-coated rolls 56. Accordingly, a pair of vertically spaced lower and upper shafts 160 and 161 are journaled in the housing 30 relatively adjacent and in substantial parallelism with the shafts 31 and 53, respectively. Both of these shafts 160 and 161 are rotatable and each has secured thereto a deflector-blade, as at 162 and 163, respectively.

Figure 6:
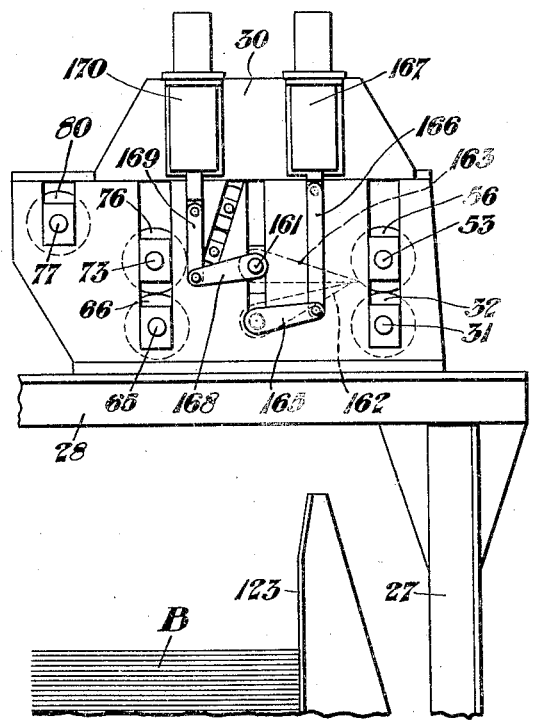
Figures 6 and 7 are enlarged detail views of part of the apparatus.

Referring to Figure 6 of the drawings, a link 165 is connected on one of its ends to the lower rotatable shaft 160 and on the other of its ends to one end of a vertical shaft 166. The other end of the vertical shaft 166 is connected to a solenoid 167 which is secured to the side of the housing 30. A link 168 is connected on one of its ends to the upper rotatable shaft 161 and on the other of its ends to one end of a vertical shaft 169. The other end of the vertical shaft 169 is connected to a solenoid 170 which is secured to the side of the housing 30 immediately adjacent the solenoid 167. The solenoids 167 and 170 are operated to position the deflector-blades 162 and 163 in such manner as to feed the sheets being weighed and classified in one of three directions as they come from between the elongated steel cylinder 32, on the shaft 31, and the rubber-coated rolls 56. These three directions are: (1) downward onto the stand B; (2) in a substantially horizontal direction between the elongated steel cylinders 66 and 76 on the shafts 65 and 73, respectively, and thence onto stand C; or (3) upwardly between the elongated steel cylinders 58 and 62 on the shafts 57 and 59, respectively, and thence onto the stand D. These three directions of movement are clearly illustrated by arrows in Figure 2.

The positioning of the deflector-blades 162 and 163 is effected through the solenoids 167 and 170, respectively, through a suitable electrical wiring circuit by contacts operated by the disposition of the beam 12 of the scale 10. The disposition of the beam 12 is, of course, dependent upon the weight of a sheet upon the disks 25 on the shafts 22 of the cradle 17.

Figure 7:
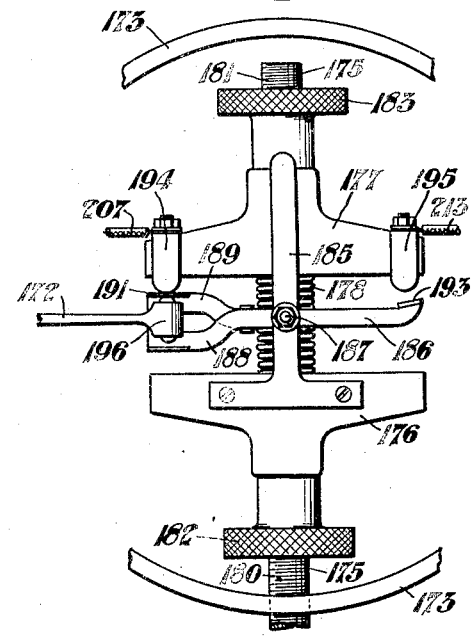

One arrangement of contacts operable in this manner is illustrated in Figure 7 of the drawings. According to this showing, the beam 12 of the scale 10 is provided with an extension 172 which extends into a contact case 173. A vertical shaft 175 is disposed within the contact case 173 and carries a pair of lower and upper cross-heads, as at 176 and 177, respectively. The cross-heads 176 and 177 are slidable on the shaft 175 and resiliently maintained apart by a coil-spring 178. The lower and upper ends of the shaft 175 are screw-threaded, as at 180 and 181, to accommodate a pair of adjusting nuts 182 and 183, respectively. A vertical extension 185 is arranged in parallelism with the shaft 175 and suitably secured to the cross-head 176. A horizontally disposed lever 186 is pivoted, as at 187, to the vertical extension 185. This lever 186 is provided on one of its ends with a fork, the lower and upper tines of which are indicated at 188 and 189, respectively. This fork, which consists of the tines 188 and 189, carries a cage 191 for a purpose to be later described.

The lever 186 is provided on its end opposite the tines 188 and 189 with an electrical contact 193. An electrical contact 194 is suitably secured to the end of the cross-head 177 which is adjacent the cage 191 on the tines 188 and 189, while a second electrical contact is secured to the other end thereof, which is adjacent the contact 193.

The end of the extension 172 on the beam 12 of the scale 10 is provided with a head 196 which is disposed in the cage 191. This permits the beam 12 of the scale to rock the shaft 186 about its pivot 187, and the meeting of either the cage 191 with the contact 194, or the meeting of the contact 193 with the contact 195.

Figure 5:
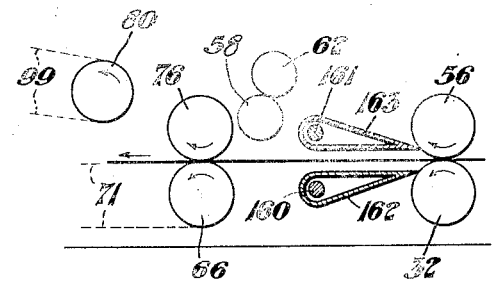

If the sheet being weighed and classified is light (for example, 39 ounces or less) the deflector blades 162 and 163 will occupy the positions shown in Figures 2 and 3. If, on the other hand, the sheet is overweight (for example, 41 ounces) the deflector blades 162 and 163 will be disposed in the positions shown in Figure 4, while a sheet of ideal weight (for example, 40 ounces) causes their disposition in the manner of Figure 5.

Referring to Figure 8 of the drawings, we have diagrammatically illustrated an electrical circuit which satisfactorily operates the various elements in the manner just recited. According to this diagram, the numbers 200 and 201 designate a pair of power lines which are connected with a suitable source of electricity. The power lines 200 and 201 are also connected to the ends of the coil of the solenoid 167 through lines 202 and 203, respectively. The lines 202 and 203 are each interrupted by a pair of contacts, as at 204ª and 204ᵇ, respectively. These contacts are simultaneously closed by the energization of a coil 204, which is connected on one of its sides to the line 203 between the contacts 204b and the power line 201 and on the other thereof to the contact 194 in the contact case 173. A line 205 is connected to the line 202 and to the extension 172 on the scale beam 12 by a flexible connection 206.

From the foregoing it will be seen that the raising of the extension 172 on the scale beam 12 will cause the cage 191 in the contact case to make contact with the contact 194, thus energizing the coil 204 to close the contacts 204a and 204b. This, of course, energizes the solenoid 167 to withdraw its operating shaft.

A pair of lines 209 and 210 are connected to the lines 202 and 203, respectively, and to the ends of the coil of the solenoid 170. These lines 209 and 210 are interrupted by contacts 212a and 212b, respectively, which are closed by the energization of a coil 212. This coil 212 is connected on one of its sides to the line 210 between the contacts 212b and the line 203, and on the other side thereof to the contact 195 in the contact case 173. It will be readily understood that the downward deflection of the extension 172 on the scale beam 12 breaks the contact of the cage 191 with the contact 194 and closes the contacts 193 and 195 in the contact case 173, thereby energizing the coil 212 to close the contacts 212a and 212b.

In this manner the solenoid 170 is actuated to withdraw its operating shaft and move the deflector blade 173 downwardly, the deenergization of the solenoid 167 having caused the deflector blade 162 to occupy a substantially horizontal position.

In operation, a sheet to be weighed and classified is moved downwardly on the belts 117 and onto the freely rotatable disks 25 on the transverse shafts 22 of the cradle 17. The gravity movement of the sheet over the disks 25 tends to depress the scale platform 14 and the sheet is weighed while out of contact with either the introductory conveyer or the classifying instrumentality, thereby permitting great accuracy. If the sheet is too light, the cage 191 in the contact case 173 will remain closed against the contact 194 with the accompanying energization of the solenoid 167. The energization of this solenoid moves the lower deflector blade 162 upwardly against the upper deflector blade 163 which occupies a substantially horizontal plane, thus permitting the elongated steel cylinder 32 to feed the sheet downwardly onto the stand B.

If, as an illustration, the next sheet to be weighed and classified proves to be heavy in weight, the extension 172 on the scale beam 12 will be deflected downwardly with the result that the contact 193 will close against the contact 195 to energize the solenoid 170, thereby raising its operating shaft vertically. This movement of the operating shaft of the solenoid 170 moves the deflector blade 163 downwardly. The lower deflector blade 162 is caused to move in a similar manner due to the previous deenergization of the solenoid 167 by the breaking of the contact of the cage 191 with the contact 194. The heavy sheet is thus fed upwardly between the elongated steel cylinders 58 and 62 on the shafts 57 and 59, respectively, and thence onto the endless belts 90 to be deposited on the stand D.

As a sheet of ideal weight moves across the freely rotatable disks 25, the extension 172 on the scale beam 12 will occupy a substantially horizontal plane, with both contacts 194 and 195 open. Accordingly, the operating shaft of the deenergized solenoid 170 drops to raise the upper deflector blade 163 into a substantially horizontal plane. The solenoid 167 being likewise deenergized permits the lower deflector blade 162 to occupy a parallel plane, thus enabling the sheet to move in a substantially horizontal plane between the elongated steel cylinders 66 and 76 on the shafts 65 and 75, respectively, and thence onto the endless belt 71, from which it falls onto the stand C. The movement of the sheet of ideal weight between the deflector blades 162 and 163 and the elongated steel cylinders 66 and 76 is augmented by an intermediately disposed guide plate 220.

Due to the mechanical lag established by the movement of the extension 172 on the scale beam 12, and its consequent movement of the lever 186, the disposition of the lower and upper deflector blades 162 and 163 respectively remain established until after the sheet has progressed thereover, therebetween or thereunder, as the case may be.

From the foregoing, it will be readily understood by those skilled in the art that any sheet material may be accurately weighed and classified within close limits and weight in a rapid and continuous manner, which results in the advantages previously recited.

While we have shown and described one specific embodiment of our invention, it will be understood that we do not wish to be limited exactly thereto, since various modifications may be made without departing from the scope of our invention, as defined by the following claims.

We claim:

1. Apparatus for automatically classifying successively fed continuously moving work-pieces according to weight comprising, in combination, a conveyer for uninterruptedly moving the work-pieces, a weighing device, an anti-friction platform carried by said weighing device and disposed at the extreme delivery end of said conveyer for receiving work-pieces delivered therefrom said anti-friction platform being constructed and arranged solely to permit the uninterrupted gravity movement of work-pieces entirely thereover and yieldable under weight to operate said weighing device, a selective classifying device disposed at the extreme delivery end of said anti-friction platform for receiving work-pieces delivered therefrom, and means operable by said weighing device for controlling said selective classifying device, said selective classifying device being operable to classify the work-pieces while permitting their uninterrupted movement.

2. Apparatus for automatically classifying successively fed work-pieces according to weight comprising, in combination, a conveyer for continuously moving the work-pieces, a weighing device, a plurality of freely rotatable disks carried by said weighing device and disposed at the extreme delivery end of said conveyer for receiving work-pieces delivered therefrom, said plurality of freely rotatable disks being constructed and arranged to permit the continuous gravity movement of work-pieces entirely thereover and yieldable under weight to operate said weighing device, a selective classifying device disposed at the extreme delivery end of said plurality of freely rotatable disks for receiving work-pieces delivered therefrom, and means operable by said weighing device for controlling said selective classifying device, said selective classifying device being operable to classify the work-pieces while permitting their continuous movement.

3. Apparatus for automatically classifying successively fed work-pieces according to weight comprising, in combination, a conveyer for continuously moving the work-pieces, a weighing device, an inclined platform carried by said weighing device and yieldable under weight to operate the same, a plurality of freely rotatable disks mounted on said inclined platform and disposed at the extreme delivery end of said conveyer for receiving work-pieces delivered therefrom, said plurality of freely rotatable disks being constructed and arranged to permit the continuous gravity movement of work-pieces entirely thereover, a selective classifying device disposed at the extreme delivery end of said plurality of freely rotatable disks for receiving work-pieces delivered therefrom, and means operable by said weighing device for controlling said selective classifying device, said selective classifying device being operable to classify the work-pieces while permitting their continuous movement.

JULIUS E. GRAF.
JAMES K. LAMOREE.